S. COLTMAN.
Water-Coolers.
No. 148,932.      Patented March 24, 1874.
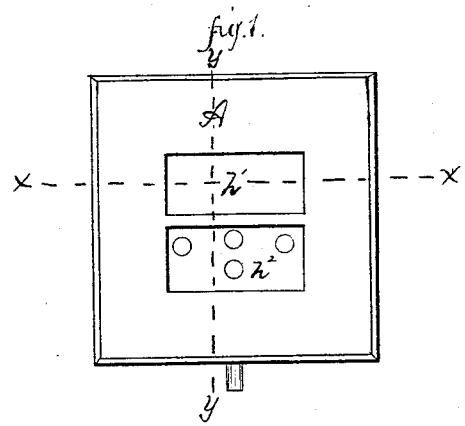
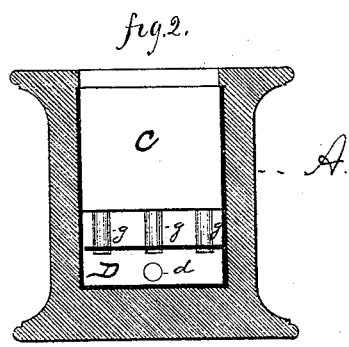
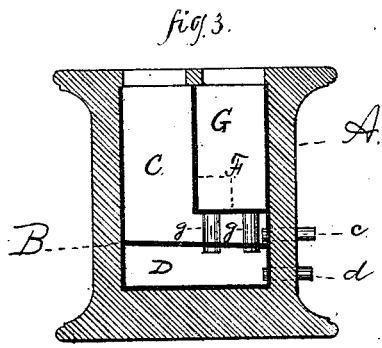
Witnesses.
Inventor.

UNITED STATES PATENT OFFICE.

SAMUEL COLTMAN, OF SHELBY, OHIO.

IMPROVEMENT IN WATER-COOLERS.

Specification forming part of Letters Patent No. 148,932, dated March 24, 1874; application filed September 17, 1873.

*To all whom it may concern:*

Be it known that I, SAMUEL COLTMAN, of Shelby, county of Richland and State of Ohio, have invented certain new and useful Improvements in Water-Coolers, of which the following is a specification:

My invention relates to certain improvements in water-coolers whereby the ice is kept separated from the water and is greatly economized; and the invention consists in a water-cooler divided by partitions into a water-chamber, an ice-chamber, and a receptacle for the waste-water resulting from the melting of the ice.

In the drawing, Figure 1 is a top view of my invention. Fig. 2 is a vertical section taken in the line $x\ x$ of Fig. 1. Fig. 3 is a vertical section taken in the line $y\ y$ of Fig. 1.

The cooler A may be of angular, cylindrical, or any other desired form, and of any suitable material. A suitable distance from the bottom of the cooler is a horizontal partition, B, of metal, preferably zinc, dividing the cooler into a water-chamber, C, above, and a receptacle, D, for the waste-water from the ice below the partition B. The waste-water receptacle D has leading from it a pipe, $d$, provided with a faucet, to provide for drawing off the water. In or about the center of the cooler is a partition, F, which runs down the sides of the cooler to a short distance from the partition B, and then turns at a right angle and extends to the front wall of the cooler, forming the ice-chamber G. This ice-chamber communicates with the waste-water receptacle D by means of tubes $g\ g$ passing through the lower and front portion of the water-chamber. The cooler is provided with two lids, $h^1\ h^2$, which are placed over the chambers C and G, so that access may be had to the water-chamber or ice-chamber independently of each other. The water-chamber has leading from it a pipe, $c$, provided with a faucet for drawing off the water. The water is placed in the water-chamber C. The ice is placed in the ice-chamber G, and is thus kept separated from the water, so that no sediment or impurity contained in the ice can come in contact with the water, while at the same time the ice does not melt so fast as if placed in the water. As the ice melts the waste-water passes into the receptacle D through the tubes $g$.

It will be seen that the refrigerators may be constructed upon the same plan as this water-cooler by using the chamber C as a receptacle for provisions instead of water.

What I claim as new, and desire to secure by Letters Patent, is—

The combination, in a water-cooler, of the chamber C with the chambers G and D and pipes $g\ g$, all arranged as set forth.

In testimony that I claim the foregoing as my invention, I hereunto affix my signature this 15th day of September, 1873.

SAML. COLTMAN.

Witnesses:
S. S. BLOOM,
J. C. HILL.